US006871219B2

United States Patent
Noordergraaf et al.

(10) Patent No.: US 6,871,219 B2
(45) Date of Patent: Mar. 22, 2005

(54) DYNAMIC MEMORY PLACEMENT POLICIES FOR NUMA ARCHITECTURE

(75) Inventors: Lisa K. Noordergraaf, Chelmsford, MA (US); Julia D. Harper, Arlington, MA (US); Prakash Khemani, Karnataka (IN)

(73) Assignee: Sun Microsystems, Inc., Santa Clara, CA (US)

( * ) Notice: Subject to any disclaimer, the term of this patent is extended or adjusted under 35 U.S.C. 154(b) by 796 days.

(21) Appl. No.: 09/801,474

(22) Filed: Mar. 7, 2001

(65) Prior Publication Data

US 2002/0129115 A1 Sep. 12, 2002

(51) Int. Cl.⁷ .............................................. G06F 12/00
(52) U.S. Cl. ...................... 709/214; 709/216; 709/218; 711/147; 711/148
(58) Field of Search ................................ 711/147, 148; 709/214, 213, 216, 218, 226; 707/101; 712/203, 225; 718/104

(56) References Cited

U.S. PATENT DOCUMENTS

| | | | | |
|---|---|---|---|---|
| 6,026,472 A | * | 2/2000 | James et al. | 711/147 |
| 6,035,377 A | * | 3/2000 | James et al. | 711/147 |
| 6,167,437 A | * | 12/2000 | Stevens et al. | 709/214 |
| 6,247,041 B1 | | 6/2001 | Krueger et al. | |
| 6,272,612 B1 | | 8/2001 | Bordaz et al. | |
| 6,289,424 B1 | | 9/2001 | Stevens | |
| 6,360,302 B1 | | 3/2002 | Baylor | |

FOREIGN PATENT DOCUMENTS

EP           982660 A2  *  3/2000

OTHER PUBLICATIONS

US 6,021,479, 2/2000, Stevens (withdrawn)
"Extending OpenMP for NUMA Machines"; J. Bircsak, P.Craig, R. Crowell, Z. Cvetanovic, J, Harris, C. Nelson, and C. Offner; In Proc. of the IEEE/ACM Supercomputing '2000: High Performance Networking and Computing Conference (SC2000), Nov. 2000.
"Exploiting Operating System Support for Dynamic Page Placement on a NUMA Shared Memory Multiprocessor"; R. LaRowe Jr., J. Wilkes, C. Ellis; Department of Computer Science, Duke University, Durham, NC.

(List continued on next page.)

Primary Examiner—B.- James Peikari
(74) Attorney, Agent, or Firm—Meyertons Hood Kivlin Kowert & Goetzel, P.C.; Rory D. Rankin

(57) ABSTRACT

A distributed shared memory multiprocessor computer system utilizes page placement policies to reduce data access latencies. Pages of memory are allocated to nodes in a distributed shared memory multiprocessor computer system. A placement policy database is maintained which indicates a placement policy for each page in the system. Upon an access to a page, the placement policy corresponding to the accessed page is determined and the indicated policy is acted upon. A Migrate on Next Touch policy provides that the next access to a page with this policy will cause the page to migrate to the node of the accessing CPU. A Memory Follows Lightweight Process (LWP) policy ensures that pages within a given address range are always local to a specified LWP. A Migrate on Every Touch policy provides that pages within a given address range are migrated to an accessing CPU on every touch. A Replicate on Remote Touch policy provides for replication of a page in the memory of each accessing CPU's domain. Finally, a Replicate on All policy provides that upon an access to a given page, that page is replicated on all nodes in the system.

39 Claims, 10 Drawing Sheets

OTHER PUBLICATIONS

"Operating System Support for Improving Data Locality on CC–NUMA Compute Servers"; B. Verghese, S. Devine, A. Gupta, and M. Rosenblum; Computer Sytem Laboratory, Stanford University, CA; c. 1996; The Association for Computing Machinery, Inc.

"Dynamic Storage Allocation: A Survey and Critical Review"; P. Wilson, M. Johnstone, M. Neely, and D. Boles; Department of Computer Sciences, University of Texas at Austin, Austin, TX.

"User–Level Dynamic Page Migration for Multiprogrammed Shared–Memory Multiprocessors"; Nikolopoulos D.S., et al.; Proceedings 2000 International Conference on Parallel Processing; Aug. 21, 2000; pp. 95–103.

"Scheduling and Page Migration for Multiprocessor Compute Servers"; Rohit, Chandra, et al.; ACM SIGPLAN Notices; Association for Computing Machinery; New York, US; vol. 29, No. 11; Nov. 1, 1994; pp.12–24.

"NUMA Policies and Their Relation to Memory Architecture"; Bolosky, W.J., et al.; Computer Architecture News; Association for Computing Machinery; New York, U.S.; vol. 19, No. 2; Apr. 1, 1991; pp. 212–221.

International Search Report; International application No. PCT/US 02/06866; Filed Mar. 4, 2002.

* cited by examiner

DYNAMIC MEMORY PLACEMENT POLICIES FOR NUMA ARCHITECTURE

BACKGROUND OF THE INVENTION

1. Field of the Invention

This invention relates to the field of multiprocessor computer systems and, more particularly, to data placement policies employed within multiprocessor computer systems having distributed shared memory architectures.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

Another structure for multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scalable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

Distributed shared memory systems may employ local and global address spaces. A portion of the global address space is assigned to each node within the distributed shared memory system. Accesses to the address space assigned to a requesting node (i.e. local address space) are typically local transactions. Accesses to portions of the address space not assigned to the requesting node are typically global transactions.

In some distributed shared memory systems, data corresponding to addresses of remote nodes may be copied to a requesting node's shared memory such that future accesses to that data may be performed via local transactions rather than global transactions. In such systems, CPU's local to the node may use the local physical address assigned to the copied data. The copied data is referred to as a shadow page. Address translation tables are provided to translate between the global address and the local physical address assigned to the shadow copy.

Because access to remote nodes may incur significant latencies as compared to local accesses, the distribution of data within the shared memory system may be very important. Vendors of NUMA machines generally supply an Application Program Interface (API) for data placement. Existing techniques may rely on users attempting to manually allocate pages or may rely on compiler technologies which analyze code. However, in many cases these techniques have not been very successful. In addition, policies for initial memory placement have been developed. For example, the "first-touch" policy dictates that a page is placed in memory near the CPU that first accesses it. Another policy, the "round-robin" policy spreads pages evenly across a machine. However, both of these policies suffer from the problem that the initial placement may not be optimal. Consequently, processes may be required to frequently access data on remote nodes and overall system performance may be degraded.

Various other mechanisms for automatic migration and replication of pages include having the operating system monitor accesses to pages, calculate statistics based on this data, and then determine which pages should be migrated or replicated. However, these policies monitor large numbers of accesses over some period of time and are generally only effective if there is both temporal and spatial locality of reference. In addition, improvements in data placement may be delayed as the mechanism monitors accesses and searches for patterns in data usage. Further, access patterns may not exist which would enable such a mechanism to be effective. Consequently, a multiprocessor computer system that provides for effective and efficient management of data placement is desired.

SUMMARY OF THE INVENTION

The problems outlined above are in large part solved by a multiprocessor computer system in which policies may be utilized which allow for flexible, dynamic data placement in a distributed shared memory multiprocessor computer system.

Broadly speaking the present invention contemplates a method and mechanism of dynamically placing data within a distributed shared memory computer system. The method includes configuring a memory management subsystem to indicate an affinity policy between a first process and a first page of memory in the computer system. Subsequently, the process is scheduled to run on a first node of the computer system. Finally, in response to detecting the process has been scheduled to run on the first node, the method contemplates moving the page which has the affinity to the process to the first node of the computer system.

Also contemplated is a method of dynamically placing data within a distributed shared memory computer system in which a memory management subsystem is configured to indicate a particular data placement policy for a page of memory when it is initially placed in a node of the computer system. Upon detecting an access to the first page by a second node of the computer system, the accessed first page is moved to the second node. In addition, the page may be replicated on one or more nodes of the computer system.

BRIEF DESCRIPTION OF THE DRAWINGS

Other objects and advantages of the invention will become apparent upon reading the following detailed description and upon reference to the accompanying drawings in which.

Figure 1A:
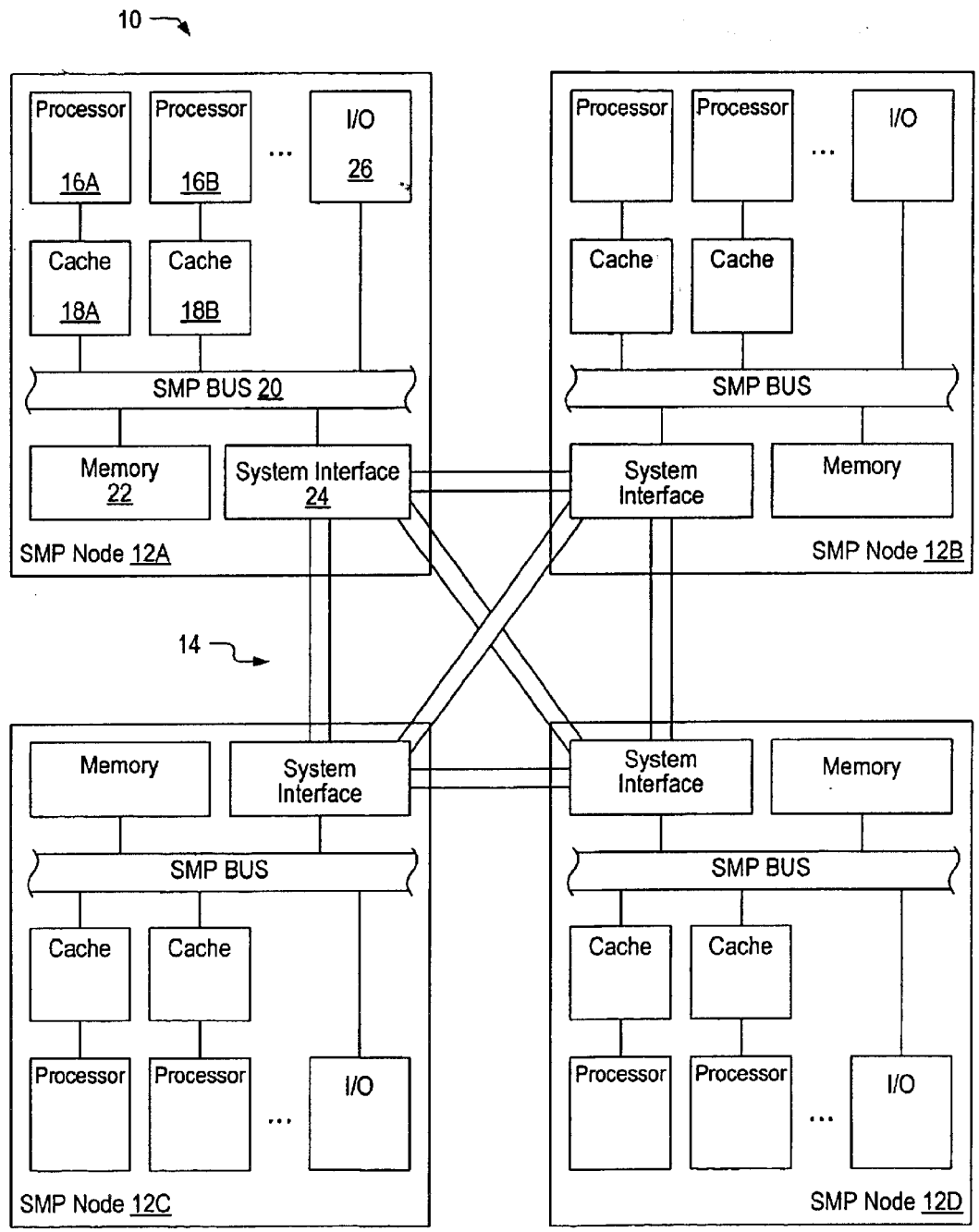
FIG. 1A is a block diagram of a multiprocessor computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

NUMA System Overview

Turning now to FIG. 1A, a block diagram of one embodiment of a multiprocessing computer system 10 is shown. Computer system 10 includes multiple SMP nodes 12A–12D interconnected by a point-to-point network 14. Elements referred to herein with a particular reference number followed by a letter will be collectively referred to by the reference number alone. For example, SMP nodes 12A–12D will be collectively referred to as SMP nodes 12. In the embodiment shown, each SMP node 12 includes multiple processors, external caches, an SMP bus, a memory, and a system interface. For example, SMP node 12A is configured with multiple processors including processors 16A–16B. The processors 16 are connected to external caches 18, which are further coupled to an SMP bus 20. Additionally, a memory 22 and a system interface 24 are coupled to SMP bus 20. Still further, one or more input/output (I/O) interfaces 26 may be coupled to SMP bus 20. I/O interfaces 26 are used to interface to peripheral devices such as serial and parallel ports, disk drives, modems, printers, etc. Other SMP nodes 12B–12D may be configured similarly.

Generally speaking, the memory, or physical address space, of a computer system is distributed among SMP nodes 12A–12D. The memory assigned to a node is referred to as the local memory of that node. Typically, accesses to a node's local memory are local transactions and accesses to other node's local memory are global transactions.

As used herein, a memory operation is an operation causing the transfer of data from a source to a destination. The source and/or destination may be storage locations within the initiator, or may be storage locations within memory. When a source or destination is a storage location within memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In the computer system shown in FIG. 1A, a memory operation may include one or more transactions upon SMP bus 20 as well as one or more coherency operations upon network 14.

Each SMP node 12 is essentially an SMP system having memory 22 as the shared memory. Processors 16 are high performance processors. It is noted that any processor architecture may be employed by processors 16.

Typically, processors 16 include internal instruction and data caches. Therefore, external caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. External caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18.

SMP bus 20 accommodates communication between processors 16 (through caches 18), memory 22, system interface 24, and I/O interface 26. In one embodiment, SMP bus 20 includes an address bus and related control signals, as well as a data bus and related control signals. A split-transaction bus protocol may be employed upon SMP bus 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

Memory 22 is configured to store data and instruction code for use by processors 16. Memory 22 preferably comprises dynamic random access memory (DRAM), although any type of memory may be used. Memory 22, in conjunction with similar illustrated memories in the other SNP nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between SMP nodes 12 as well as among processors 16 and caches 18 within a particular SMP node 12A–12D. System interface 24 provides internode coherency, while snooping upon SMP bus 20 provides intranode coherency.

In addition to maintaining internode coherency, system interface 24 detects addresses upon SMP bus 20 which require a data transfer to or from another SMP node 12. System interface 24 performs the transfer, and provides the corresponding data for the transaction upon SMP bus 20. In the embodiment shown, system interface 24 is coupled to a point-to-point network 14. However, it is noted that in alternative embodiments other networks may be used. In a point-to-point network, individual connections exist between each node upon the network. A particular node communicates directly with a second node via a dedicated link. To communicate with a third node, the particular node utilizes a different link than the one used to communicate with the second node.

It is noted that, although four SMP nodes 12 are shown in FIG. 1A, embodiments of computer system 10 employing any number of nodes are contemplated.

Figure 1B:
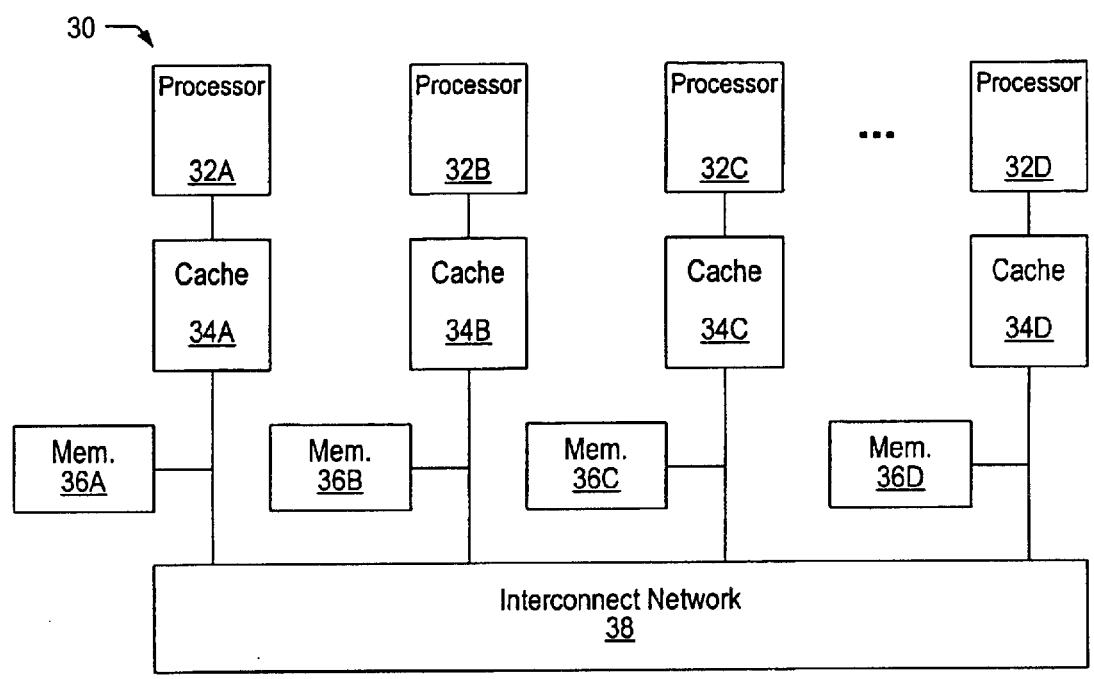
FIG. 1B is a conceptualized block diagram depicting a non-uniform memory architecture supported by one embodiment of the computer system shown in FIG. 1A

Turning now to FIG. 1B, a logical diagram depicting a first memory architecture 30 supported by one embodiment of computer system 10 is shown. Architecture 30 includes multiple processors 32A–32D, multiple caches 34A–34D, multiple memories 36A–36D, and an interconnect network 38. The multiple memories 36 form a distributed shared memory. Each address within the address space corresponds to a location within one of memories 36.

Architecture 30 is a non-uniform memory architecture (NUMA). In a NUMA architecture, the amount of time required to access a first memory address may be substantially different than the amount of time required to access a second memory address. The access time depends upon the origin of the access and the location of the memory 36A–36D which stores the accessed data. For example, if processor 32A accesses a first memory address stored in memory 36A, the access time may be significantly shorter than the access time for an access to a second memory address stored in one of memories 36B–36D. That is, an access by processor 32A to memory 36A may be completed locally (e.g. without transfers upon network 38), while a processor 32A access to memory 36B is performed via network 38. Typically, an access through network 38 is slower than an access completed within a local memory.

Data corresponding to addresses stored in remote nodes may be cached in any of the caches 34. However, once a cache 34 discards the data corresponding to such a remote address, a subsequent access to the remote address is completed via a transfer upon network 38.

NUMA architectures may provide excellent performance characteristics for software applications which use addresses that correspond primarily to a particular local memory. Software applications which exhibit more random access patterns and which do not confine their memory accesses to addresses within a particular local memory, on the other hand, may experience a large amount of network traffic as a particular processor 32 performs repeated accesses to remote nodes.

Figure 2:
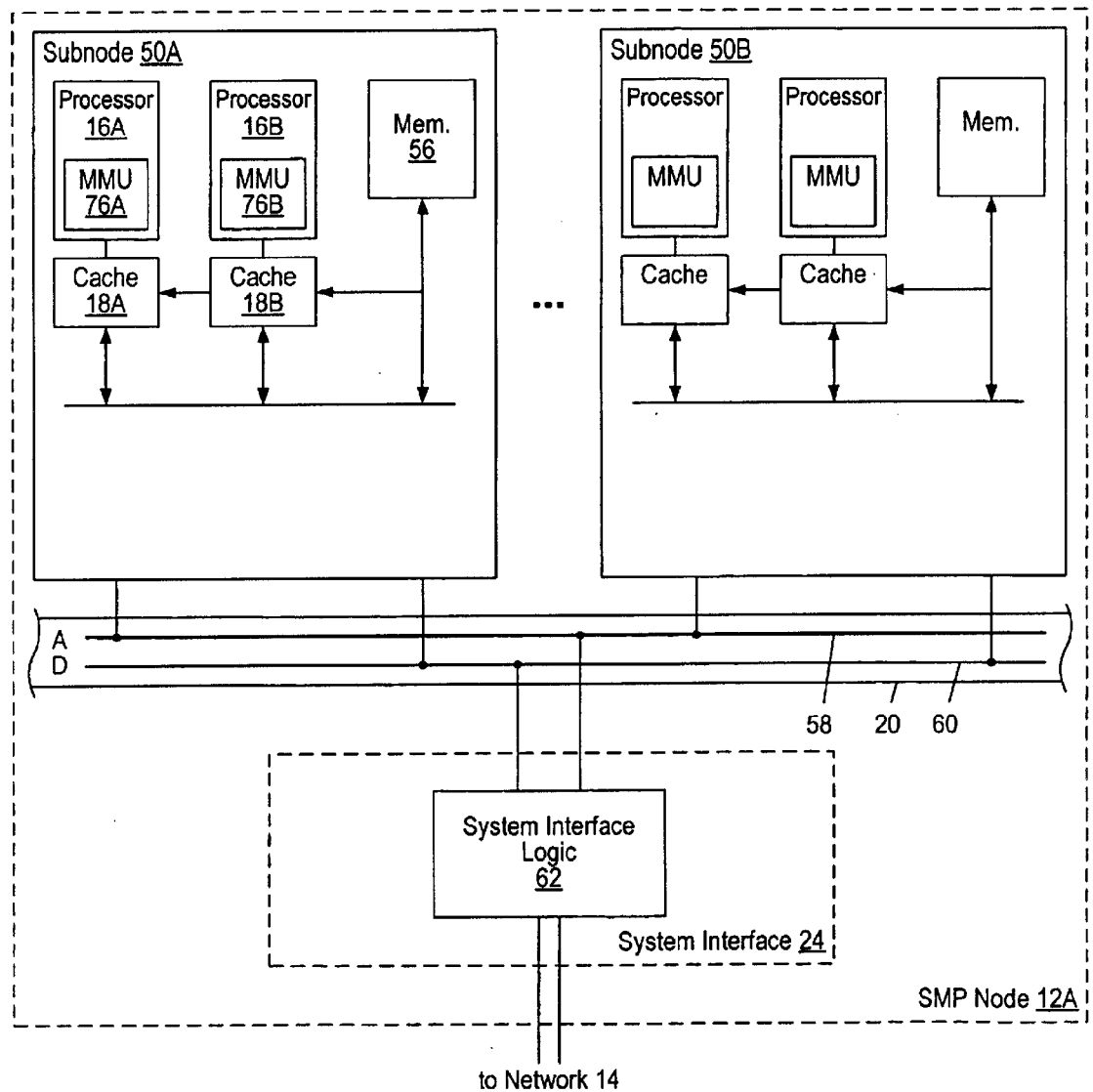
FIG. 2 is a block diagram of one embodiment of a symmetric multiprocessing node depicted in FIG. 1A.

FIG. 2 depicts details of one implementation of an SMP node 12A that generally conforms to the SMP node 12A shown in FIG. 1A. Other nodes 12 may be configured similarly. It is noted that alternative specific implementations of each SMP node 12 of FIG. 1A are also possible. The implementation of SMP node 12A shown in FIG. 2 includes multiple subnodes such as subnodes 50A and 50B. Each subnode 50 includes two processors 16 and corresponding caches 18 and a memory portion 56. The memory portions 56 within subnodes 50 collectively form the memory 22 of the SMP node 12A of FIG. 1A. Other subnodes (not shown) are further coupled to SMP bus 20 to form the I/O interfaces 26.

As shown in FIG. 2, SMP bus 20 includes an address bus 58 and a data bus 60. FIG. 2 also illustrates system interface 24, including a system interface logic block 62. Logic block 62 is coupled to both address bus 58 and data bus 60. Additionally, logic block 62 is coupled to network 14.

For the embodiment of FIG. 2, each subnode 50 is configured upon a printed circuit board which may be inserted into a backplane upon which SMP bus 20 is situated. In this manner, the number of processors and/or I/O interfaces 26 included within an SMP node 12 may be varied by inserting or removing subnodes 50. For example, computer system 10 may initially be configured with a small number of subnodes 50. Additional subnodes 50 may be added from time to time as the computing power required by the users of computer system 10 grows.

Memory Management

Processors 16 as shown in FIG. 2 may include a memory management unit (MMUs) 76A–76B. MMUs 76 perform a virtual to physical address translation upon the data addresses generated by the instruction code executed upon processors 16, as well as the instruction addresses. The addresses generated in response to instruction execution are virtual addresses. In other words, the virtual addresses are the addresses created by the programmer of the instruction code. The virtual addresses are passed through an address translation mechanism (embodied in MMUs 76), from which corresponding physical addresses are created. The physical address identifies a storage location within memory 22.

Virtual to physical address translation is performed for many reasons. For example, the address translation mechanism may be used to grant or deny a particular computing task's access to certain memory addresses. In this manner, the data and instructions within one computing task are isolated from the data and instructions of another computing task. Additionally, portions of the data and instructions of a computing task may be "paged out" to a hard disk drive. When a portion is paged out, the translation is invalidated. Upon access to the portion by the computing task, an interrupt occurs due to the failed translation. The interrupt allows the operating system to retrieve the corresponding information from the hard disk drive. In this manner, more virtual memory may be available than actual memory in memory 22. Many other uses for virtual memory are well known.

As discussed above, various policies exist for the initial allocation of pages of memory among nodes in a system. One such policy is the "first-touch" policy. The first-touch policy allocates a page of memory to the node containing the CPU which first accesses, or "touches", that page. Another common initial placement policy is the "round-robin" policy. In the round-robin policy, a first page may be allocated to the node containing the CPU which first accesses it and remaining pages are allocated to remaining nodes in some predefined order. For example, if node 3 in a system first accesses a page A in memory, page A may be allocated to node 3. Subsequently, page B may be allocated to node 4, page C to node 1 and page D to node 2, and so on. Unfortunately, in many cases, both of the above policies may result in an allocation of pages which is non-optimal. Consequently, system performance may suffer.

Dynamic Placement Policies

In order to overcome the problems associated with existing techniques and policies, new policies are introduced for dynamically placing pages of memory in a distributed memory computing system. In one embodiment, these policies may be referred to as migrate_on_next_touch, memory_follows_lwp, migrate_on_every_touch, replicate_on_remote_touch, and replicate_on_all. Each of these new policies are generally used subsequent to the initial placement of pages within a system. The following is a brief description of each of these policies.

The migrate_on_next_touch policy dictates that the next touch of a page by any CPU causes that page to migrate to that CPU's node. Once migrated, the page may be assigned a default policy. A default placement policy may be any of the policies described herein, or any other suitable placement policy. The memory_follows_lwp policy ensures that pages within a given address range are always local to a specified lightweight process (lwp). As used herein, the term lightweight process includes any type of thread or thread of control. The migrate_on_every_touch policy provides that pages within a given address range are migrated to an accessing CPU on every touch. The replicate_on_remote_touch policy provides for replication of a page in the memory of each accessing CPU's domain. Finally, the replicate_on_all policy provides that upon an access to a given page, that page is replicated on all nodes in the system.

In one embodiment, each node maintains a database for assigning and retrieving the policy pertaining to address ranges or pages of memory. Such a database may take any of a number of well known forms. For example, in one embodiment the database may be maintained as a red-black binary tree. Alternatively, an AVL binary-tree, or any other suitable form may be used. In one embodiment, management of the database may be a subsystem of the memory management system. Alternatively, management of the database may be performed entirely in software, hardware or a combination of software and hardware. In addition, policy management may be divided between platform-specific and platform-independent portions.

Figure 3:
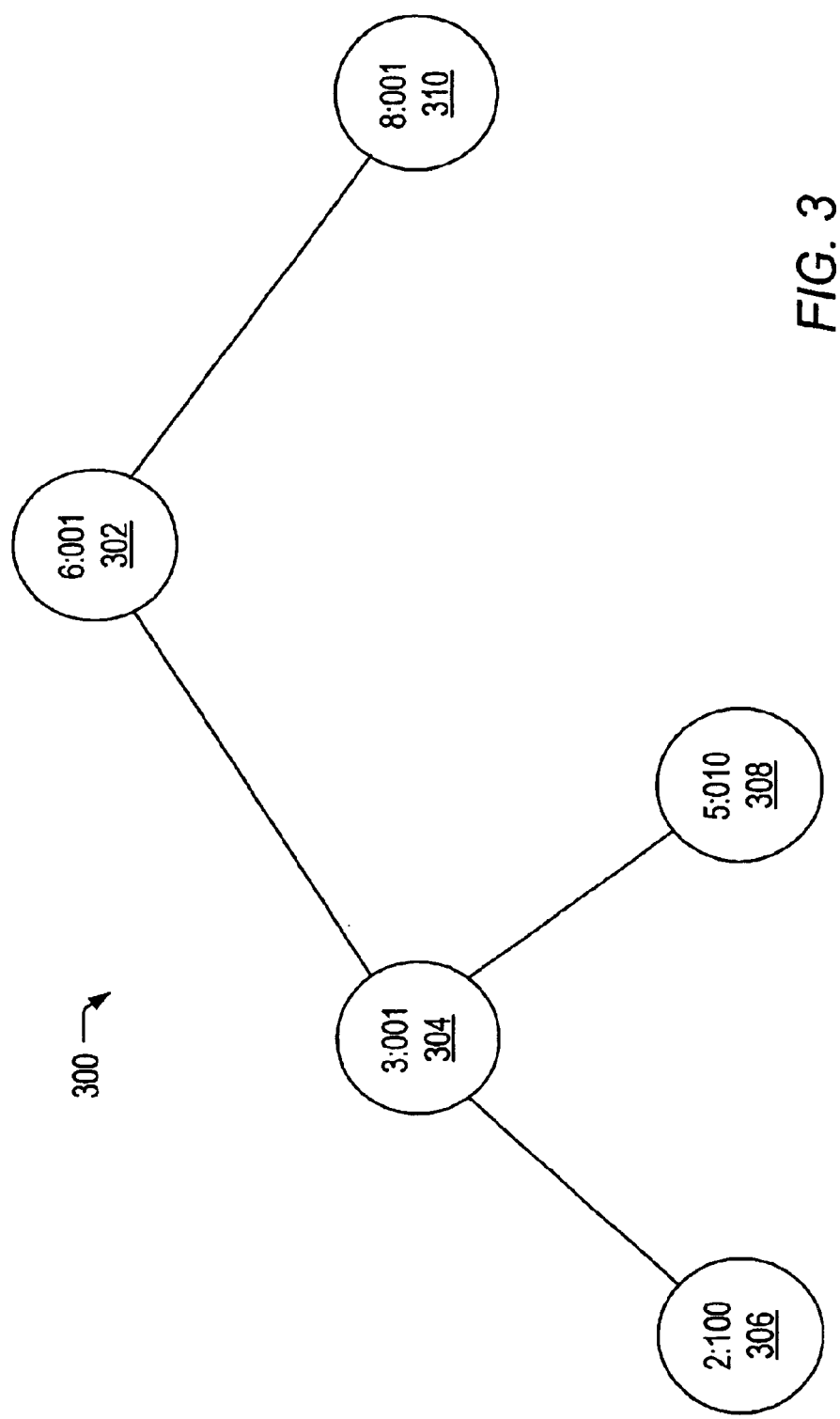
FIG. 3 is a diagram of one embodiment of a policy database data structure.

FIG. 3 is a diagram showing one embodiment of a placement policy database 302. The diagram in FIG. 3 is intended to be exemplary only, as those skilled in the art may readily discern. FIG. 3 is a binary tree 300 with five nodes, 302, 304, 306, 308 and 310. Each node contains a page ID and placement policy in the form PageID:Policy. For illustrative purposes, the page ID shown in FIG. 3 is simply a numeral and the policy is indicated by three bits. In one embodiment, the page ID included in each node of the tree 300 may comprise an address corresponding to the page. The policy bits included in each node of tree 300 may correspond to one of the above described page placement policies. For example, the bits 001 may correspond to the migrate_on_next_touch policy, the bits 010 may correspond to the memory_follows_lwp policy, and so on. In addition to a page ID and policy indication, other information may be included as well, such as a red/black indication or validity information. Those skilled in the art will recognize that utilizing a structure such as that in FIG. 3 may provide for faster access times when searching for the placement policy corresponding to a particular page.

Figure 4:
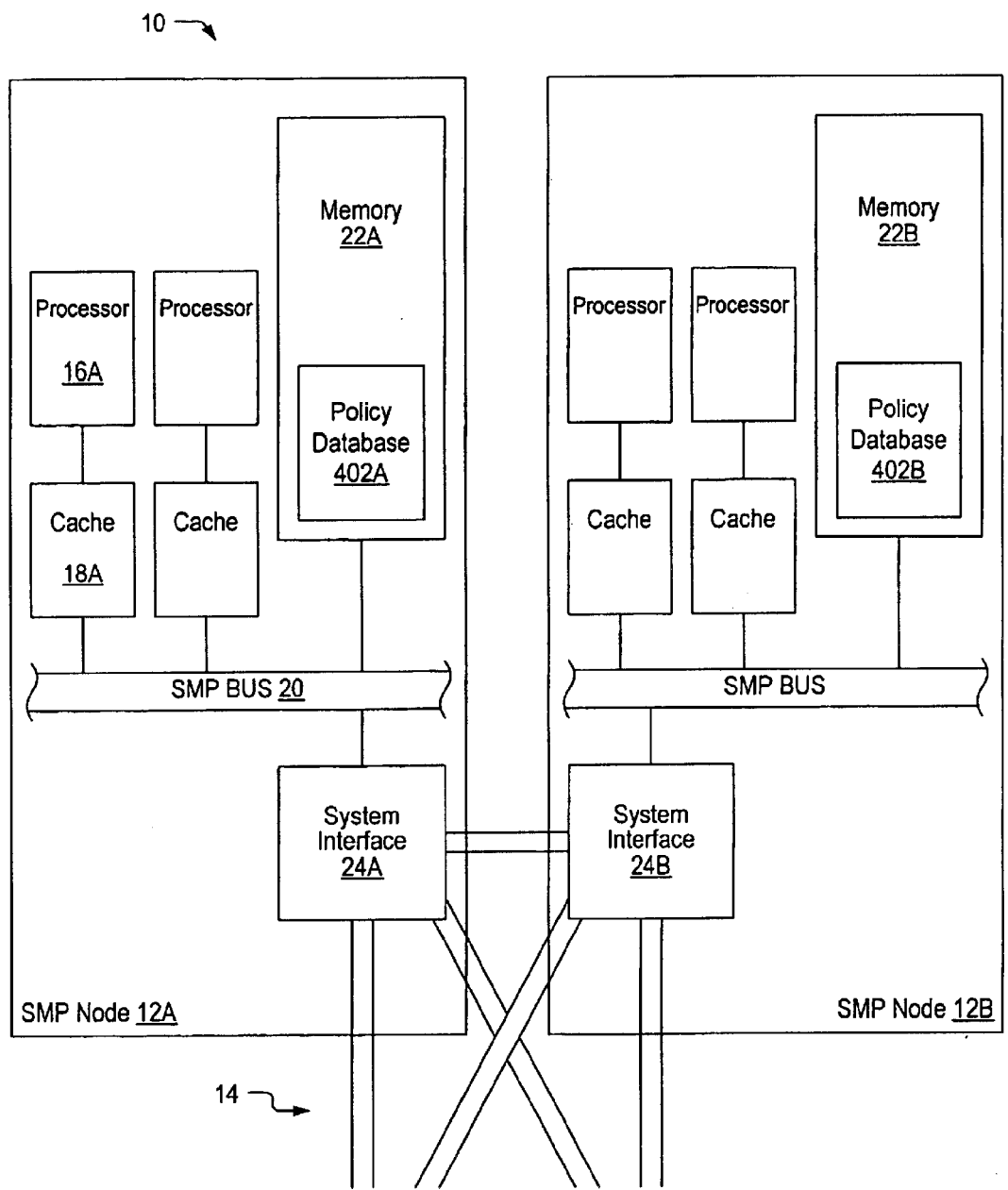
FIG. 4 is a block diagram of two nodes of a multiprocessor computer system in FIG. 1A.

FIG. 4 is an exemplary illustration of two nodes in a distributed memory computing system 10. System 10 includes two SMP nodes 12A–12B. Each node 12 includes two processors 16, L2 caches 18, memory 22, SMP bus 20 and system interface 24. In the embodiment shown, placement policy database 402 is maintained in memory 22. Like other contents of memory 22, portions of policy database 402 may be cached in the L2 cache 18 or L1 cache of processor 16. In one embodiment, each node 12 in a system maintains policy information for each of its home pages. Other alternatives are possible as well, such as having each node maintain policy information for all pages in the system.

In general, when a processor in a node 16 accesses a page in memory 22, an access is made to policy database 302 as well. Upon detecting the policy corresponding to the accessed page, the indicated policy may be acted upon. For example, if processor 16A accesses a page of memory which is not local to node 12A, but is local to node 12B, a request for the data may be conveyed to node 12B by any one of a number of well known protocols. Upon detecting the data request, node 12B may also access the policy database 302B for the placement policy entry corresponding to the accessed page. If the placement policy entry indicates action is required (e.g., migrating the page to node 12A), node 12B may convey an indication of this policy action upon interface 14. Nodes 12 may then update their respective policy databases 302 as needed.

In one embodiment, nodes only maintain policy information for pages which are home to that node. Advantageously, the size of policy database 302 may be reduced. Consequently, when a page migrates to a new home node, the policy database in the new home node is updated by creating a new entry corresponding to the new page and the policy database in the previous home node is updated by deleting the corresponding entry in the policy database. Depending on the particular configuration of system 10, information related to changes in ownership of a page and policy information may be conveyed differently. For example, if system 10 utilizes a point-to-point protocol and nodes only track placement policies for home pages, changes in page ownership and policy may be communicated from one node directly to another without broadcasting to all nodes. Alternatively, in a system 10 where all nodes maintain policy information for all pages in a system, changes in page ownership and policy may be broadcast to all nodes. Numerous possibilities exist for conveying pertinent policy information between nodes. In the following, each of the placement policies is discussed in detail.

Migrate on Next Touch

The migrate_on_next_touch policy may be particularly useful for redistributing data during the runtime of multi-threaded code. As described above, the first-touch policy is one of the most commonly used initial placement policies on NUMA machines. However, the first-touch initial placement policy has a major drawback. If the page data in question is initialized serially, the data may all be placed on a single node. Serial initializations often occur via explicit serial loops that initialize arrays, either to some predetermined value, or with data being read (serially) from a sequential file. The migrate_on_next_touch policy can correct for single node placement. In particular, if this policy is applied to the affected array or range of memory on entry to the parallel section of code, the data is migrated to the location of the first accessing thread in the parallel section. This policy may offer a significantly easier method of redistribution that do more traditional policies which may require the user to explicitly understand and specify exactly to where the data need be migrated.

Figure 5:
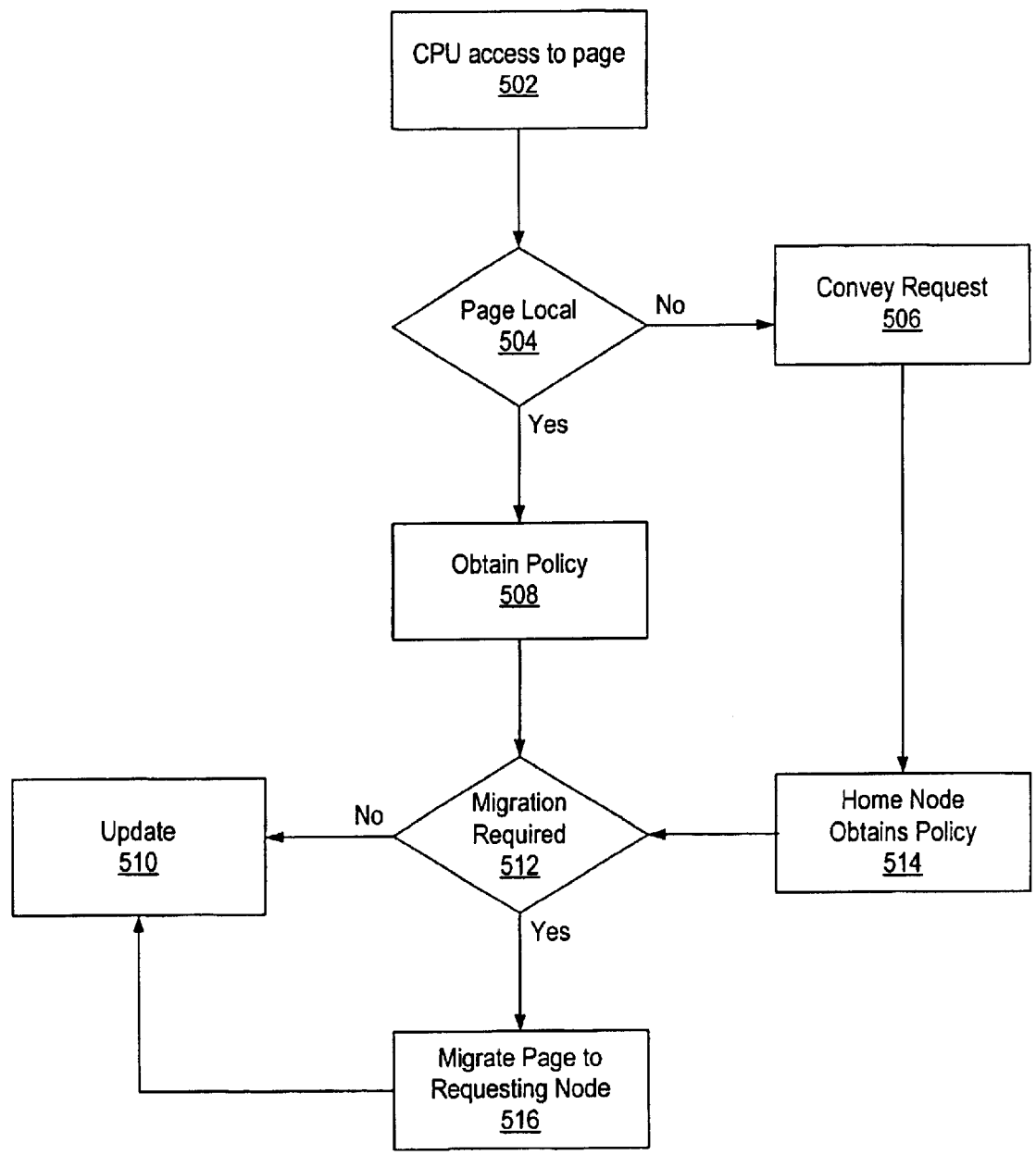
FIG. 5 is a flow diagram of one embodiment of a migrate on next touch policy.

FIG. 5 is a flowchart illustrating one embodiment of the migrate_on_next_touch policy. When an access is made to a page (block 502), a determination is made as to whether the page is local to the node of the requesting CPU (decision block 504). If the page is not local, the request is conveyed to the home node (506) and the home node obtains the placement policy pertaining to the accessed page (block 514). If the page is local to the node of the requesting CPU (decision block 504), the placement policy pertaining to the accessed page may be obtained from the policy database in the node of the requesting CPU (block 508). If the retrieved placement policy is the migrate_on_next_touch and indicates the policy action has not yet been taken, the accessed page is migrated to the node of the requesting CPU (block 516). In the event the page is already local to the node of the requesting CPU, no page migration is required. Finally, the placement policy information corresponding to the accessed page may be updated (block 510). In one embodiment, updates (block 510) may include additions or deletions from node policy databases 302, changes in policies to be applied to a page, or any other changes desired. For example, subsequent to acting on a migrate_on_next_touch policy for a page, policy information corresponding to that page may be updated to indicate a default policy, such as a policy to leave the page in the current node on future accesses.

Multi-user Environments and Memory Follows LWP

Whereas many memory placement policies allow for optimization of performance in dedicated environments, multi-user environments introduce additional requirements. For example, in order for explicit memory placement policies to work effectively, one must also insure that the threads accessing the memory stay in the expected places; typically this is done by binding threads to nodes or processors. However, policies which tie threads or memory to particular physical resources are inappropriate in a multi-user environment as they may interfere with the operating system's ability to properly manage resources. A typical scenario is that the first N nodes or CPUs of a machine become over-utilized (everyone starts binding at the lowest numbers), and everyone's performance suffers. One method of dealing with this problem is to virtualize the requirements of an application in such a way that the operating system is able to consider the requirements of all competing processes, and then allocate resources in a way which best meets the needs of all tasks.

It is possible to think of threads as nothing more than virtual processors. Similarly, one may think of each virtual processor as having some amount of "local" memory associated with itself. Binding memory or threads to physical resources may thus be avoided by establishing policies which establish a binding between particular threads and particular memory. That is, rather than bind both threads and memory to particular physical resources, one could employ a scheme whereby data was tightly tied to particular threads. Utilizing such a scheme, the operating system would determine where particular threads are executed, and make an effort to ensure that the memory associated with those threads is local to where the threads are actually executing. Should it become necessary to shuffle threads between nodes, then the associated memory should also move to those nodes on an as-needed basis.

It should be noted that this type of policy is not limited in its use to multithreaded codes; a single-threaded application by definition has one thread which is associated with all data in that process. Hence, this type of policy may also improve the performance of single-threaded codes in multi-user environments by quickly migrating data if the process is moved to a different node due to load balancing activity.

In one embodiment, this policy is implemented as a "memory follows LWP" policy (memory_follows_lwp). This policy allows for specification of a range of virtual addresses which should "follow" a particular LWP. That is, if the LWP moves to a new node, the memory should also be migrated. In one embodiment, memory is not actually migrated until it is touched from the remote node. In an alternative embodiment, a policy in which memory follows the next LWP which touches it is implemented. Advantageously, it is possible to specify that memory is to follow a LWP at a particular time (on the next touch), but not on subsequent touches.

Figure 6:
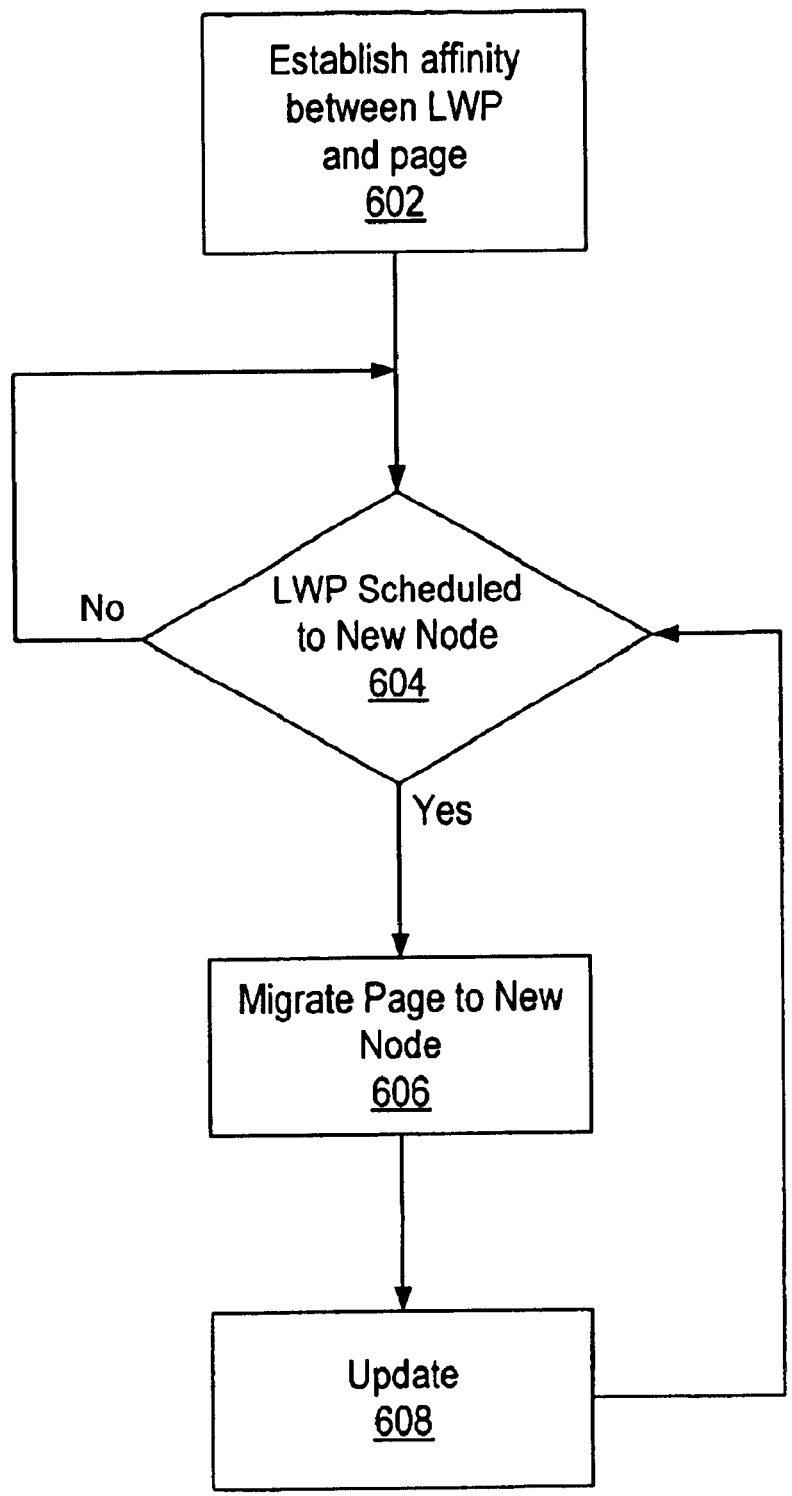
FIG. 6 is a flow diagram of one embodiment of a memory follows lightweight process policy.

Turning now to FIG. 6, a flowchart illustrating one embodiment of a memory_follows_lwp policy is shown. In the exemplary embodiment show, the memory_follows_ lwp policy sets up an affinity between a specific lwp and a page, or pages, of memory. When such an affinity is established by this policy, the page is placed on the node where the lwp has been scheduled to run. If the lwp is rescheduled to run on a different node, the page is migrated to that new node. If there are no remote accesses (accesses from threads running on remote nodes) to this memory, then a similar affinity may be accomplished with the migrate_on_every_ touch policy. However, in the case of a multi-threaded program, one cannot generally guarantee that there will be no accesses from remote lwps. In addition, this policy may be used to lessen the impact of load balancing operations.

As shown in FIG. 6, an affinity is created between a lwp and a page (block 602). Subsequent to scheduling the lwp, a determination is made as to whether the lwp has been scheduled to run on a new node (decision block 604). Scheduling of threads may be a function of the operating system kernel, a thread library, or some other well known means. If the lwp is scheduled to run on a new node, the page corresponding to the lwp is migrated to the new node (block 606). In one embodiment, a message may be conveyed to the new node directly or by broadcast that the page is migrating to the new node. Such a message may be conveyed upon determining that the lwp has been scheduled for the new node (decision block 604). Alternatively, the page corresponding to the lwp may be migrated to the new node upon access to the page by the lwp running on the new node. Finally, subsequent to determining a lwp has been scheduled to run on a new node (decision block 604) and migrating the corresponding page (block 606), an update to page placement policy information or policy databases may be performed as described above (block 608).

Migrate on Every Touch

The migrate_on_every_touch policy could be applied to all pages in the process space. If an access to memory occurs from a remote CPU, the page is migrated to the node of the requesting CPU. In the case of a single threaded process, consisting of only a single lightweight process, such a remote access would occur only when the process was rescheduled to run on a different node. Such a mechanism aids in minimizing the overhead of load balancing, that is shuffling processes amongst nodes so that no single node has too much work while other nodes have spare CPU cycles.

Figure 7:
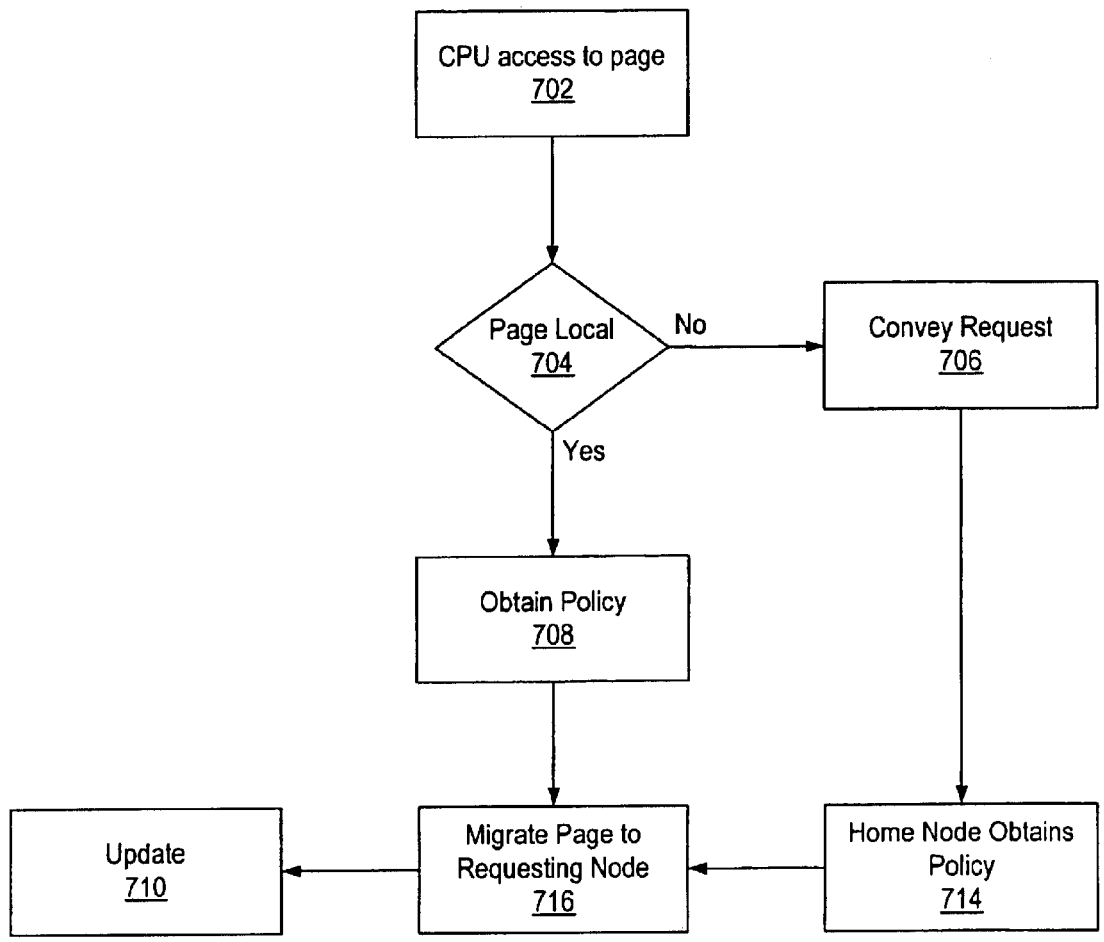
FIG. 7 is a flow diagram of one embodiment of a migrate on every touch policy.

FIG. 7 is a flowchart illustrating one embodiment of the migrate_on_every_touch policy. When an access is made to a page (block 702), a determination is made as to whether the page is local to the node of the requesting CPU (decision block 704). If the page is not local, the request is conveyed to the home node (706) and the home node obtains the placement policy pertaining to the accessed page (block 714). If the page is local to the node of the requesting CPU (decision block 704), the placement policy pertaining to the accessed page may be obtained from the policy database in the node of the requesting CPU (block 708). If the retrieved placement policy is the migrate_on_every_touch policy, the accessed page is migrated to the node of the requesting CPU (block 716). In the event the page is already local to the node of the requesting CPU, no page migration is required. Finally, the placement policy information corresponding to the accessed page may be updated (block 710). As described above, in one embodiment updates (block 710) may include additions or deletions from node policy databases 302, changes in policies to be applied to a page, or any other changes desired.

Replicate on All

Upon an access to a page in which the replicate_on_all policy applies, the page being accessed is replicated on all nodes in the system. One benefit of such a policy is that when applied to the process space of multi-threaded code, the replicate_on_all policy effectively allows one to see how well a code might perform if the ideal cache-line placement were achieved. Since replication has some overhead, this is actually an upper bound on ideal performance. Having an upper bound is extremely useful to someone optimizing code for good memory placement. Previously, there was no simple or obvious way to tell if changing page placements might result in performance improvements. Another advantage of replicating pages on all nodes is that it may provide for the ideal placement of cache lines which are not written from different nodes. The "replicas" (replicated pages) may all be setup prior to executing the application core and thus overhead is reduced during actual runtime. One possible disadvantage of the replicate_on_all policy is that many replicas may be created that are never used. Consequently, additional memory may be required which is not efficiently utilized.

Figure 8:
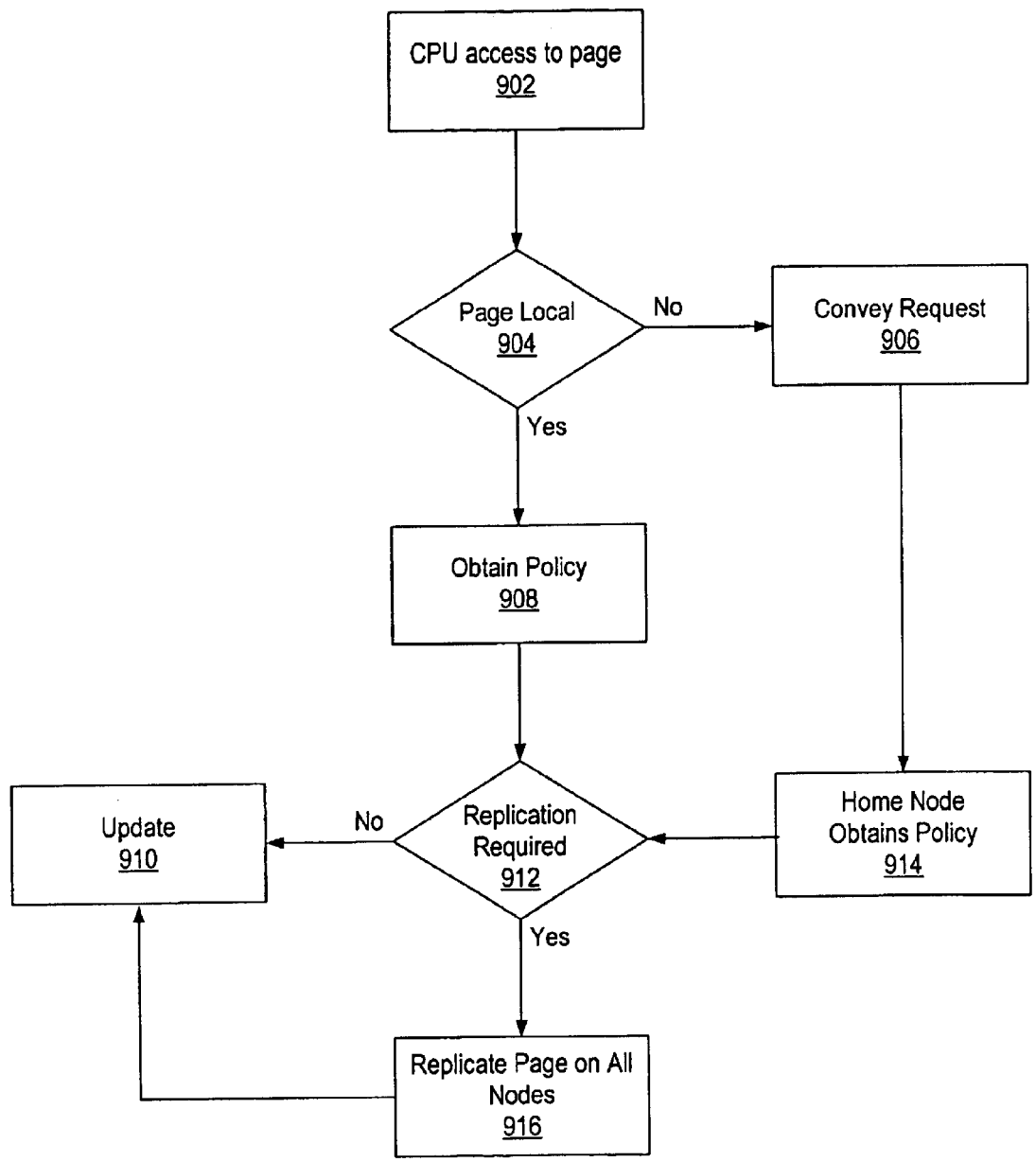
FIG. 8 is a flow diagram of one embodiment of a replicate on every touch policy.

FIG. 8 shows a flowchart illustrating one embodiment of the replicate_on_all policy. When an access is made to a page (block 902), a determination may be made as to whether the page is local to the node of the requesting CPU (decision block 904). If the page is not local, the request is conveyed to the home node (906) and the home node obtains the placement policy pertaining to the accessed page (block 914). If the page is local to the node of the requesting CPU (decision block 904), the placement policy pertaining to the accessed page may be obtained from the policy database in the node of the requesting CPU (block 908). If the retrieved placement policy is the replicate_on_all policy and replication is required (block 912), the accessed page is replicated on all nodes of the system (block 916). Finally, the placement policy information corresponding to the accessed page may be updated (block 910). As described above, in one embodiment updates (block 910) may include additions or deletions from node policy databases 302, changes in policies to be applied to a page, or any other changes desired. In one embodiment, additional policy information maybe maintained for a page to indicate it has already been replicated on all nodes. Alternatively, a page with the replicate_on_all policy applied to it may have its policy changed entirely once it has been replicated on the system.

Replicate on Remote Touch

Figure 9:
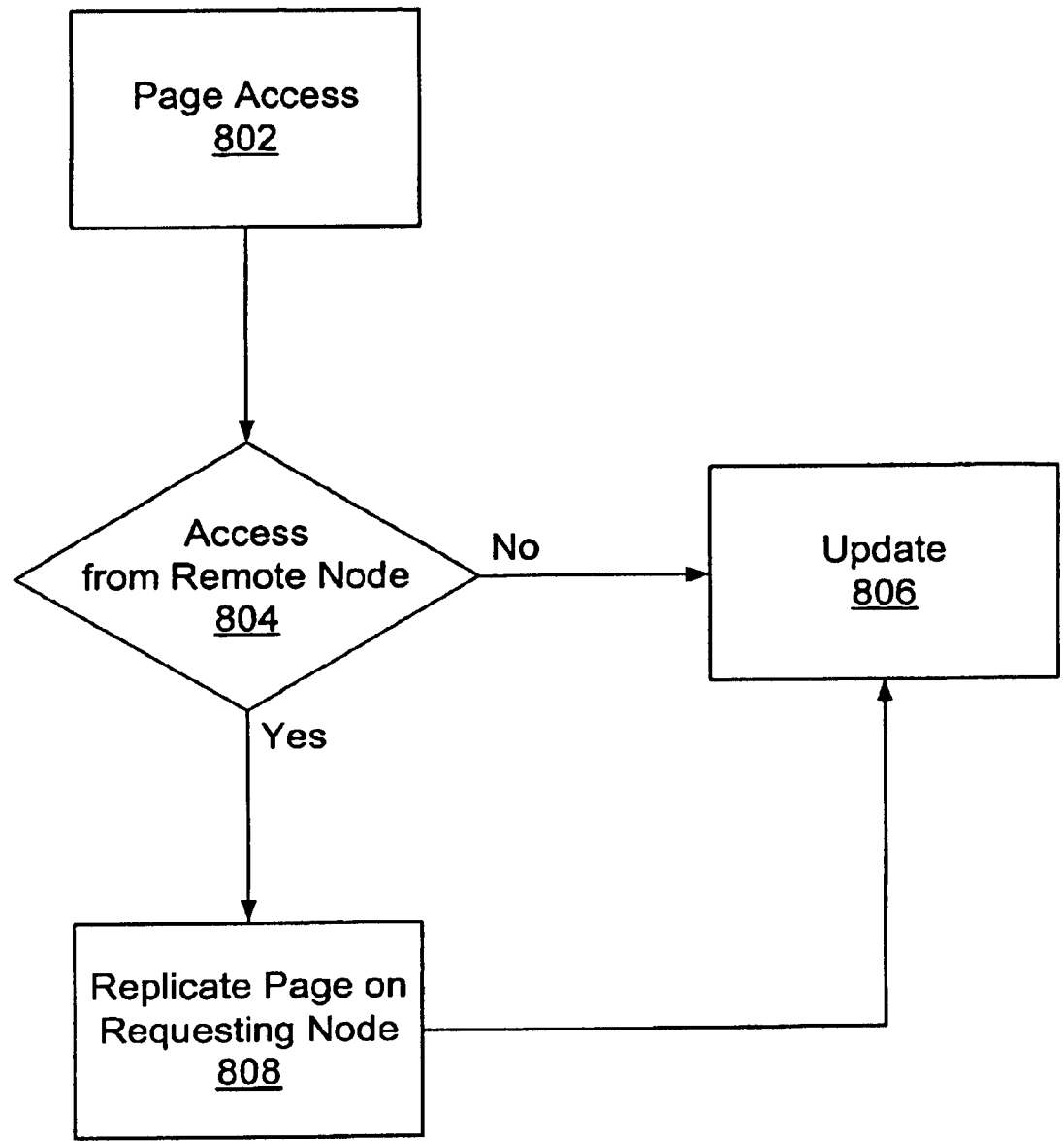
FIG. 9 is a flow diagram of one embodiment of a replicate on next touch policy.

The replicate_on_remote_touch policy ensures that pages are only replicated on nodes from which remote accesses actually occur. A flowchart of one embodiment of the replicate_on_remote_touch policy is shown in FIG. 9. Upon a page access (block 802), a determination is made as to whether the access is from a remote node (decision block 804). If the access is not from a remote node, an update as described above may be performed (block 806). In the event the access is from a remote node (decision block 804), the accessed page is replicated on the node corresponding to the requesting CPU (block 808) and an update may then be performed (block 806). In addition, the replicate_on_remote_touch policy ensures that only remotely referenced pages are replicated. By only replicating remotely referenced pages, all the benefits of the replicate_on_all policy may be obtained, without the above described problem of replicas which are created but not used.

Although SMP nodes 12 have been described in the above exemplary embodiments, generally speaking an embodiment of computer system 10 may include one or more processing nodes. As used herein, a processing node includes at least one processor and a corresponding memory. Additionally, circuitry for communicating with other processing nodes is included. When more than one processing node is included in an embodiment of computer system 10, the corresponding memories within the processing nodes form a distributed shared memory. A processing node may be referred to as remote or local. A processing node is a remote processing node with respect to a particular processor if the processing node does not include the particular processor. Conversely, the processing node which includes the particular processor is that particular processor's local processing node.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, RDRAM, SRAM, etc.), ROM, etc. as well as transmission media or signals such as electrical, electromagnetic, or digital signals, conveyed via a communication medium such as network and/or a wireless link. For example, the embodiments described herein may be included in the functionality of a computer operating system which is stored on a storage medium, or which is conveyed via a transmission medium. Numerous variations and modifications will become apparent to those skilled in the art once the above disclosure is fully appreciated. It is intended that the following claims be interpreted to embrace all such variations and modifications.

What is claimed is:

1. A method of dynamically placing data within a distributed shared memory computer system comprising:
    configuring a memory management subsystem to indicate an affinity policy between a first process and a first page of memory of a plurality of pages of memory of said computer system;
    scheduling said first process to run on a first node of a plurality of nodes of said computer system; and
    placing said first page in said first node of said computer system in response to detecting said scheduling.

2. The method of claim 1, wherein said process is a lightweight process and said affinity policy is a memory_follows_lwp policy.

3. The method of claim 2, wherein said placing is in further response to detecting an access to said first page by said first process.

4. The method of claim 2, wherein a first placement policy is applied to said first page, wherein said first placement policy indicates said first page is to follow a next process which touches memory corresponding to said first page, and wherein said affinity is indicated between said first page and said first process in response to detecting said first process is a next process to touch said first page.

5. The method of claim 4, wherein a default policy is applied to said first page subsequent to said placing said first page.

6. The method of claim 3, further comprising updating said affinity policy in response to detecting said placing.

7. A method of dynamically placing data within a distributed shared memory computer system comprising:
    configuring a memory management subsystem to indicate a first data placement policy corresponding to a first page of a plurality of pages of memory, wherein said first page has an initial placement corresponding to a first node of a plurality of nodes of said system;
    detecting an access to said first page by a second node of said plurality of nodes; and
    placing said first page in said second node of said computer system in response to detecting said access.

8. The method of claim 7, wherein said first data placement policy is a migrate_on_next_touch policy and said first page is migrated to said second node from said first node.

9. The method of claim 7, wherein said first data placement policy is a replicate_on_next_touch policy and said first page is replicated on said second node.

10. The method of claim 7, wherein said first data placement policy is a replicate_on_all policy and said first page is replicated on said plurality of nodes.

11. The method of claim 7, wherein said first data placement policy is a migrate_on_every_touch policy and said first page is migrated to said second node from said first node.

12. The method of claim 7, further comprising updating said first data placement policy in response to detecting said placing.

13. The method of claim 7, further comprising obtaining said first data placement policy from a home node of said first page.

14. A distributed shared memory computer system including a plurality of nodes, said system comprising:
    a first node of said plurality of nodes, wherein said first node is configured to indicate a first data placement policy corresponding to a first page of a plurality of pages of memory, wherein said first page has an initial placement corresponding to said first node; and
    a second node of said plurality of nodes, wherein said second node is configured to access said first page, and wherein said second node is configured to place said first page in said second node in response to detecting an access to said first page by said second node.

15. The system of claim 14, wherein said first data placement policy is a migrate_on_next_touch policy and said first page is migrated to said second node from said first node.

16. The system of claim 14, wherein said first data placement policy is a replicate_on_next_touch policy and said first page is replicated on said second node.

17. The system of claim 14, wherein said first data placement policy is a replicate_on_all policy and said first page is replicated on said plurality of nodes.

18. The system of claim 14, wherein said first data placement policy is a migrate_on_every_touch policy and said first page is migrated to said second node from said first node.

19. The system of claim 14, further comprising updating said first data placement policy in response to detecting said placing.

20. The system of claim 14, further comprising obtaining said first data placement policy from a home node of said first page.

21. A distributed shared memory computer system including a plurality of nodes, said system comprising:
- a first node of said plurality of nodes, wherein said first node is configured to indicate an affinity policy between a first process and a first page of memory of a plurality of pages of memory of said computer system; and
- a process scheduler, wherein said scheduler is configured to schedule said first process to run on said first node;
- a memory management subsystem, wherein said memory management subsystem is configured to place said first page in said first node in response to detecting said scheduling.

22. The computer system of claim 21, wherein said first process is a lightweight process and said affinity policy is a memory_follows_lwp policy.

23. The computer system of claim 22, wherein said memory management subsystem is configured to place said first page in further response to detecting an access to said first page by said first process.

24. The computer system of claim 23, wherein a first placement policy is applied to said first page, wherein said first placement policy indicates said first page is to follow a next process which touches memory corresponding to said first page, and wherein said affinity is indicated between said first page and said first process in response to detecting said first process is a next process to touch said first page.

25. The computer system of claim 24, wherein a default policy is applied to said first page subsequent to said placing said first page.

26. The computer system of claim 24, further comprising updating said affinity policy in response to detecting said placing.

27. A carrier medium comprising program instructions, wherein the program instructions are computer-executable to:
- configure a memory management subsystem to indicate an affinity policy between a first process and a first page of memory of a plurality of pages of memory of a computer system;
- schedule said first process to run on a first node of a plurality of nodes of said computer system; and
- place said first page in said first node of said computer system in response to detecting said scheduling.

28. The carrier medium of claim 27, wherein said process is a lightweight process and said affinity policy is a memory_follows_lwp policy.

29. The carrier medium of claim 28, wherein said first page is placed in said first node in further response to detecting an access to said first page by said first process.

30. The carrier medium of claim 29, further comprising updating said affinity policy in response to detecting said first page is placed.

31. The carrier medium of claim 28, wherein a first placement policy is applied to said first page, wherein said first placement policy indicates said first page is to follow a next process which touches memory corresponding to said first page, and wherein said affinity is indicated between said first page and said first process in response to detecting said first process is a next process to touch said first page.

32. The carrier medium of claim 31, wherein a default policy is applied to said first page subsequent to placing said first page.

33. A carrier medium comprising program instructions, wherein the program instructions are computer-executable to:
- configure a memory management subsystem to indicate a first data placement policy corresponding to a first page of a plurality of pages of memory, wherein said first page has an initial placement corresponding to a first node of a plurality of nodes of a computer system;
- detecting an access to said first page by a second node of said plurality of nodes; and
- placing said first page in said second node of said computer system in response to detecting said access.

34. The carrier medium of claim 33, wherein said first data placement policy is a migrate_on_next_touch policy and said first page is migrated to said second node from said first node.

35. The carrier medium of claim 33, wherein said first data placement policy is a replicate_on_next_touch policy and said first page is replicated on said second node.

36. The carrier medium of claim 33, wherein said first data placement policy is a replicate_on_all policy and said first page is replicated on said plurality of nodes.

37. The carrier medium of claim 33, wherein said first data placement policy is a migrate_on_every_touch policy and said first page is migrated to said second node from said first node.

38. The carrier medium of claim 33, further comprising updating said first data placement policy in response to detecting said placing.

39. The carrier medium of claim 33, further comprising obtaining said first data placement policy from a home node of said first page.

* * * * *